March 15, 1966  A. L. LEE  3,240,968
EXTERNALLY COOLED INDUCTION MOTOR
Filed Nov. 8, 1962  2 Sheets-Sheet 1
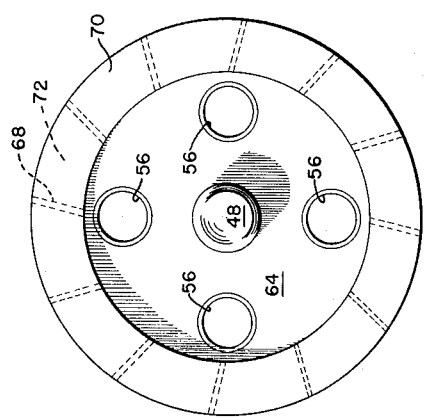
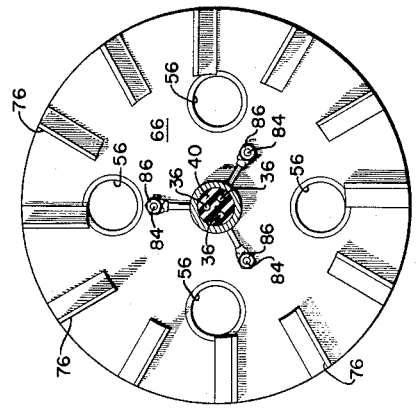
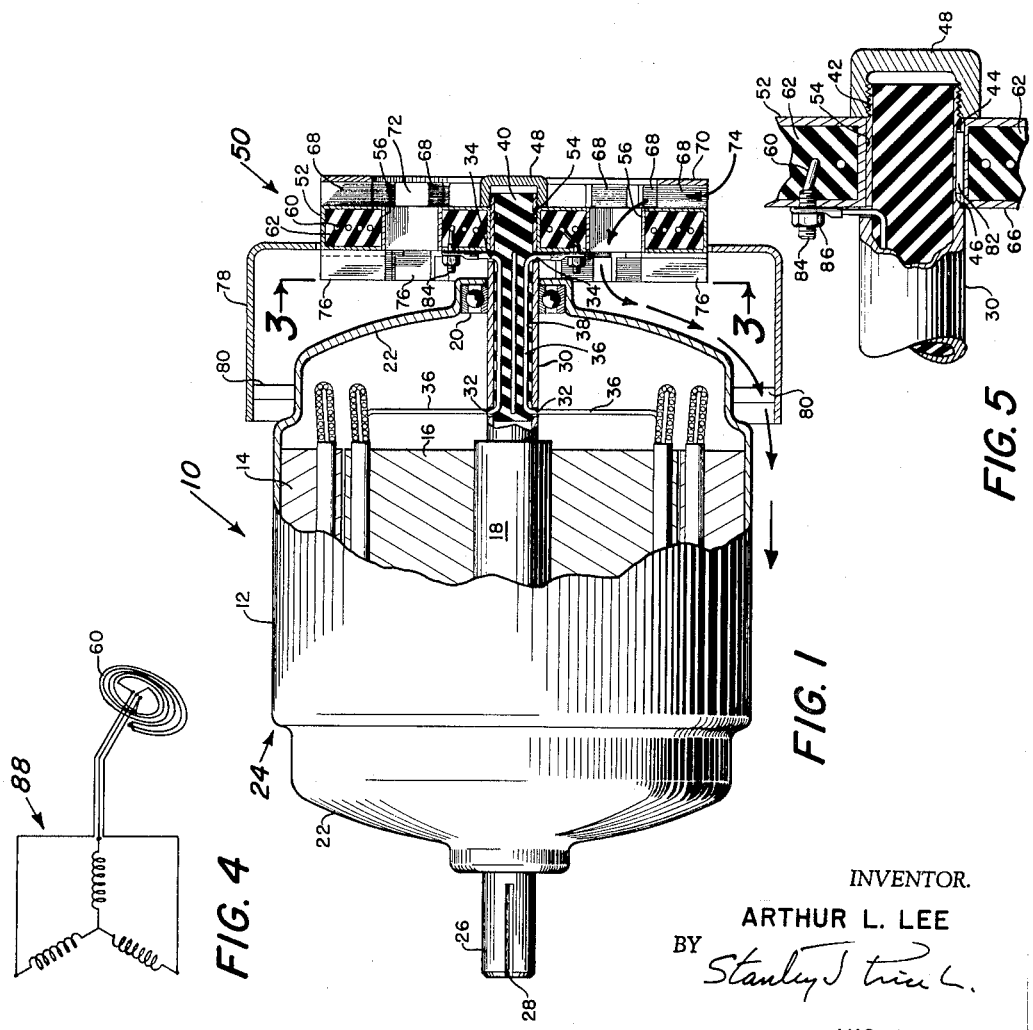
INVENTOR.
ARTHUR L. LEE
BY Stanley J. Price
HIS ATTORNEY March 15, 1966     A. L. LEE     3,240,968
EXTERNALLY COOLED INDUCTION MOTOR
Filed Nov. 8, 1962     2 Sheets-Sheet 2

INVENTOR.
ARTHUR L. LEE
BY Stanley J Price

HIS ATTORNEY

United States Patent Office 3,240,968
Patented Mar. 15, 1966

3,240,968
EXTERNALLY COOLED INDUCTION MOTOR
Arthur L. Lee, Columbus, Ohio, assignor to Consolidation Coal Company, Pittsburgh, Pa., a corporation of Pennsylvania
Filed Nov. 8, 1962, Ser. No. 236,783
4 Claims. (Cl. 310—59)

This invention relates to an externally cooled induction motor and more particularly to a polyphase induction motor having a resistance element mounted externally thereon.

The present application is a continuation-in-part of my copending application Serial No. 771,877, filed November 4, 1958, now abandoned, and assigned to the assignee of the present invention.

It is well known that alternating current motors which are subjected to high starting torques generate large amounts of heat within the rotor. It is difficult to dissipate the heat so generated because of the motor enclosure and the limited ventilation available for the rotor. It has, therefore, been the practice in the past to increase the size of the rotor to provide a greater cooling surface so that the temperature of the rotor may be maintained within safe limits. This type of motor construction results in large, cumbersome motors for limited torque applications. To circumvent this problem and maintain the size of the rotor within appreciable limits, external stationary resistance elements have been connected to the rotor through slip rings. With this arrangement the external resistance is heated instead of the rotor itself. The use of slip rings and brushes increases the cost of the motor and also presents maintenance problems not otherwise present in induction motors.

One form of the present invention provides a resistance element secured to the rotor shaft externally of the motor housing. The resistance element is connected to the rotor by means of conduits extending through a passageway in the rotor shaft. The resistance element is heated instead of the rotor and the heat is dissipated by radiation and, in addition, by convection with air that passes over both the resistance element and the motor housing.

Another form of the present invention is directed to a squirrel cage induction motor. The rotor bars of the squirrel cage motor extend through the motor housing and are connected to a separate conductor means that has a high resistance and low conductivity. The conductor means is heated instead of the rotor bars within the motor housing and the heat is dissipated by radiation and, in addition, by convection with air that passes over both the resistance element and the motor housing.

Accordingly, the principal object of this invention is to provide an induction motor with an improved external heat dissipating means.

Another object of this invention is to provide the basic rotor of a polyphase induction motor with a resistance element mounted externally of the motor housing.

One of the features of my invention is a disc shaped resistance element mounted on the rotor shaft externally of the motor housing. This resistance element is connected through conductor means to the rotor.

Another feature of one form of my invention is the tubular rotor shaft which provides a passageway for the conductor means from the rotor to the externally mounted resistance element.

Another feature of the second form of my invention is the provision of conductor means having high resistance and low conductivity connected to the rotor bars of a squirrel cage induction motor.

These and other objects and features of this invention will be more completely disclosed and described in the following specification, the accompanying drawings and the appended claims.

In the accompanying drawings, to be taken as part of this specification, I have fully and clearly illustrated my invention, in which drawings:

FIGURE 1 is a top plan view of one form of my improved electric motor having a cut away portion illustrating a tubular shaft and the resistance element in section.

FIGURE 2 is a view in front elevation of the resistance element illustrated in FIGURE 1.

FIGURE 3 is a view in rear elevation of the resistance element taken along the line 3—3 in FIGURE 1.

FIGURE 4 is a schematic wiring diagram of the externally mounted resistance element with the annular casing removed therefrom.

FIGURE 5 is a fragmentary view in section of the resistance element as it is secured to the rotor shaft.

Figure 6:
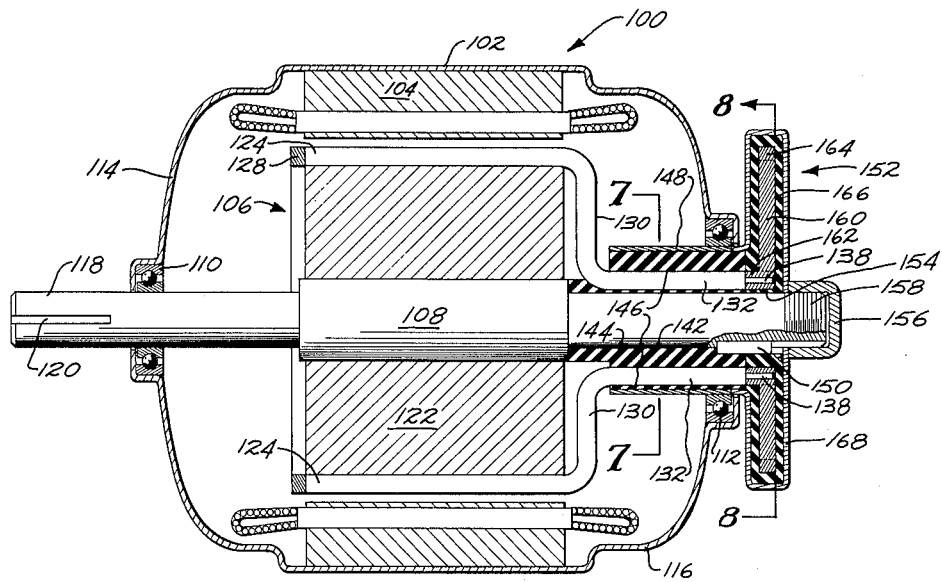
FIGURE 6 is a view similar to FIGURE 1 of another form of my invention taken along the line 6—6 of FIGURE 8.

Referring to FIGURES 1-5 there is shown an electric motor generally designated by the numeral 10 having a cylindrical housing 12. A stator core 14 is secured to and supported within the cylindrical housing 12 adjacent the housing inner wall. A basic rotor 16 is positioned within the stator core 14 and includes a shaft 18 which is rotatably supported in bearings 20 adjacent each end. The bearings 20 are supported in end shields or enclosures 22 which have central apertures therethrough. The cylindrical housing 12 and end shields 22 together form a motor enclosure designated by the numeral 24. The rotor shaft 18 extends through the bearings 20 and has a first end portion 26 having a keyway 28 therein. The rotor shaft end portion 26 is adapted to be secured through a suitable coupling to a means that is driven by the electric motor 10.

The shaft 18 has a tubular other portion 30 that also extends through the aperture in end shield 22 and is supported in bearings 20. The shaft tubular portion 30 has a group of radial apertures 32 adjacent the rotor 16 and within the motor enclosure 24. The shaft tubular portion 30 has another group of radial apertures 34 positioned in spaced relation with the end shield 22 and externally of the motor enclosure 24.

The basic rotor 16 has its rotor bars connected in series in three groups to form a three phase winding (FIG. 4). The circuits of the three phases are connected to three conductors 36 that extend through the respective apertures 32 into the passageway 38 formed in the shaft tubular portion 30 (FIG. 1). The conductors 36 extend through the passageway 38 and exit therefrom through the respective radial apertures 34. The conductors 36 within passageway 38 are imbedded in a material 40 that is a nonconductor of electricity. The material 40 fixedly positions the conductors 36 in the passageway 38 so that they are not adversely affected by the centrifugal force exerted thereon during rotation of rotor 16 and shaft 18. The shaft tubular portion 30 has an externally threaded end portion 42 with a longitudinal keyway 44 therein. The shaft tubular portion 30 has a shoulder portion 46 in spaced relation to the threaded end portion 42. An internally threaded cap member 48 is threadedly secured to the shaft end portion 42 and closes the open end portion of the tubular passageway 38.

An annular disc shaped member generally designated by the numeral 50 has a casing 52 with a central aperture 54 therethrough. The casing 52 also has a plurality of spaced apertures 56 therethrough which serve as air passageways. The casing 52 has an internal annular cavity in which there is positioned a plurality of resistance elements 60. The resistance elements 60 are imbedded in a material 62 which is a nonconductor of electricity and preferably has a high rate of heat transmission. The material 62 insulates the resistance elements 60 from the casing 52 and yet serves as a heat transfer medium.

The disc shaped element 50 has a front surface 64 and a rear surface 66. Secured to and extending outwardly from the disc front surface are a plurality of air directing fins 68. The fins 68 are suitably secured to the disc front surface 64 as by welding or the like. An annular plate 70 is secured to the front portions of the fins 68 and provide air inlet channels 72 between the respective fins 68. The arrows 74 in FIGURE 1 indicate the direction of air movement as the disc shaped member 50 rotates on shaft 18. Both the fins 68 and the annular plate 70 are in heat exchange relation with the disc front surface 64 to assist in dissipating heat therefrom through radiation. As the air passes through the air inlet channels 72 it is directed through the air passageways 56 toward the motor enclosure 24. Secured to the disc rear surface 66 are a plurality of fins 76 which through their pitch direct the air away from the center of the disc 50 and around the motor enclosure 24. A cylindrical duct 78 is secured to and maintained in proper spaced relation with the end enclosure 22 by means of spacers 80. The duct 78 serves to direct the air passing through passageways 56 around the motor enclosure 24.

The disc 50 is secured to the rotor shaft 18 in nonrotatable relation thereto by means of the disc rear surface 66 abutting the shoulder 46 and the key 82 keying the disc 50 to the shaft tubular portion 30. The cap member 48 abuts the disc front surface 64 and urges the disc rear surface 66 against the shoulder 46. The casing 52 has terminals 84 extending rearwardly from the rear surface 66. The conductors 36 which extend outwardly through the shaft apertures 34 are connected to the respective terminals 84 and are fixedly secured thereto by nuts 86.

Referring to FIGURE 4 the resistance elements 60 are suitably connected to each other to form a three phase resistance element wherein the resistances are substantially equal and connected to each other and to the respective three phase winding of the motor generally designated by the numeral 88 in FIGURE 4. It should be understood that the three phase arrangement is presented as an example only and this invention encompasses other suitable arrangements. The disc shaped member 50 is so constructed that the resistance elements 60 are heated instead of the rotor 16. This results in an electric motor that may be subjected to high starting torques without a large amount of internal heat being generated. Thus, induction motors of smaller size employing my invention may be satisfactorily used in place of larger size motors previously employed.

The disc shaped member 50 may be easily removed from the rotor shaft 18 by disconnecting the conductors 36 from the terminals 84. The end cap 48 and key 82 are removed from the shaft end portion 42 and the disc member 50 is removed therefrom. Other similarly shaped members having circuits of either greater or lesser resistance may be substituted for the disc shaped member 50, thus changing the total resistance of the rotor circuit and thereby varying the properties of the induction motor.

Figure 8:
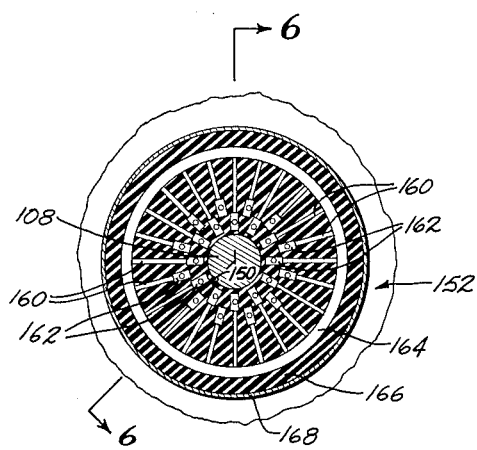
FIGURE 8 is a view in section taken along the line 8—8 of FIGURE 6.
Figure 7:
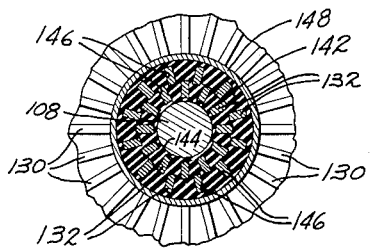
FIGURE 7 is a view in section taken along the line 7—7 of FIGURE 6.

Now referring to FIGURES 6–8 another form of my invention is illustrated. In FIGURE 6 there is shown a squirrel cage induction motor generally designated by the numeral 100, having a cylindrical housing 102. A stator core 104 is secured to and supported within the cylindrical housing 102 adjacent the housing inner wall. A basic rotor generally designated 106 is positioned within the stator core 104 and includes a shaft 108 which is rotatably supported at one end in bearings 110 and supported at the other end in bearings 112. The bearing 110 is supported in an end shield or enclosure 114 which has a central aperture therethrough. The bearings 112 are similarly supported in the other end shield or enclosure 116 and the housings 102 and end shields 114 and 116 form a motor enclosure. The rotor shaft 108 extends through the bearing 110 and has an end portion 118 with a keyway 120. The shaft end portion 118 is adapted to be secured through a suitable coupling to a means that is driven by the electric motor 100.

The basic rotor 106 has a cylindrical core 122 with suitable slots that carries a large number of bars 124 on its periphery. At one end the bars 124 are joined together by a ring 128. At the other end of the cylindrical core 122 the bars 124 have an inturned intermediate portion 130 and outturned end portions 132. The outturned end portions 132 are arranged in generally parallel spaced relation to shaft 108 and are in staggered relation to each other along concentric circular paths, as is illustrated in FIGURE 7. This arrangement provides a means for extending the bars through an annular space of minimum diameter as will be later explained. The bar end portions 132 have cylindrical terminals 138, and are supported in a cylindrical member 142 that has a central bore 144 and a plurality of axial rectangular slots 146. The cylindrical member 142 is positioned on shaft 108 and the bar end portions 132 extend through the axial slots 146. The cylindrical member 142 is fabricated of a nonconducting material and has an external cylindrical casing 148 which is supported in bearing 112. The cylindrical member 142 is nonrotatably secured to the shaft 108 by means of a key 150 positioned in mating keyways in shaft end portion 118 and cylindrical member 142. The bar end portions 132 that extend through the respective axial rectangular slots 146 are spaced from the shaft 108 and are in nonconducting relation therewith.

A disc generally designated by the numeral 152 has a central aperture 154. The shaft 108 extends through the aperture 154 in disc 152 and is nonrotatably secured to shaft 108 by means of cap member 156. The cap member 156 is threadedly secured to shaft end portion 158 and the cap member 156 urges the disc member 152 against the cylindrical member 142. The disc 152 has a plurality of radially extending conductors 160 which have an inner end portion 162 with sockets that receive the terminals 138 of the rotor bar end portions 132. The peripheral end portions of conductors 160 are connected to each other by the ring member 164. The conductors 160 and ring member 164 are preferably imbedded in a nonconducting material 166 that is enclosed in a metallic casing 168.

The conductors 160 have a high resistance when compared with the resistance of the rotor bars 124. The conductors 160 further have a low conductivity when compared with the conductor bars 124. The conductor bar end portions 132 are suitably connected to the conductors 160 by means of the terminals 138 extending into sockets in the conductor end portions 162. With this arrangement the conductor elements 160 within disc 152 are heated instead of the rotor bars 124. This results in a squirrel cage motor that may be subjected to high starting torques without a large amount of internal heat being generated.

The disc shaped member 152 may be easily removed from the rotor shaft 108 by removing the cap member 156 and key member 150. The terminals 138 of rotor bars 124 are disconnected from the conductors 160 and the disc member may be removed from the shaft 108. Other similar discs having conductors of either greater or lesser resistance may be substituted for the disc member 152 to thereby change the resistance and amount of heat generated by the externally positioned conductors.

While there is in this application specifically disclosed several forms which this invention may assume in practice, it will be understood that these forms are shown for purposes of illustration and that the invention may be modified and embodied in various other forms without departing from its spirit or the scope of the appended claims.

According to the provisions of the patent statutes, I have explained the principle, preferred construction, and mode of operation of my invention and have illustrated and described what I now consider to represent its best embodiments. However, I desire to have it understood that, within the scope of the appended claims, the invention may be practiced otherwise than as specifically illustrated and described.

I claim:

1. In a squirrel cage electric induction motor the combination comprising a motor enclosure, stator windings positioned within said enclosure, a basic rotor positioned within said enclosure in rotatable relation with said stator windings, said basic rotor having a plurality of longitudinally extending rotor bars, a ring member electrically connecting said bars at one end, said rotor member including a shaft supported by said enclosure and having an end portion projecting outwardly therefrom, said rotor bars having portions converging toward said shaft and other portions extending longitudinally adjacent to said shaft and projecting outwardly of said enclosure, a fixed resistance element of a first specified value nonrotatably and removably secured to said shaft end portion externally of said enclosure so that said resistance element rotates with said shaft, said resistance element having receiver portions for said rotor bar portions projecting from said enclosure, means removably connecting said rotor bar end portions projecting from said enclosure in said resistance element receiver portions to thereby electrically connect said resistance element to said basic rotor, said resistance element and said shaft so constructed and arranged that said resistance element may be readily removed and replaced by a second fixed resistance element of a second specified value whereby the operating characteristics of said induction motor may be varied, each of said resistance elements having a greater resistance to electric current than said basic rotor so that said resistance element then installed is heated instead of said basic rotor when said rotor is energized.

2. In a squirrel cage electric induction motor the combination comprising a motor enclosure, stator windings positioned within said enclosure, a basic rotor positioned within said enclosure in rotatable relation with said stator, said basic rotor having a plurality of longitudinally extending rotor bars, a ring member electrically connecting said bars at one end, said rotor member including a shaft supported by said enclosure and having an end portion projecting outwardly therefrom, said rotor bars having portions converging toward said shaft and other portions extending longitudinally adjacent to said shaft and projecting outwardly of said enclosure, a cylindrical member of nonconducting material having an axial passageway therethrough positioned on and rotatable with said shaft, said cylindrical member projecting outwardly from said enclosure and having a plurality of other longitudinal passageways extending therethrough, said rotor bar other portions extending through said other longitudinal passageways in said cylindrical member and projecting outwardly of said enclosure, a fixed resistance element of a first specified value nonrotatably and removably secured to said shaft end portion externally of said enclosure so that said resistance element rotates with said shaft, said resistance element having receiver portions, and means connecting said rotor bar other portions with said resistance element terminal portions to thereby electrically connect said rotor bars to said resistance element, said resistance element and said shaft so constructed and arranged that said resistance element may be readily removed and replaced by a second fixed resistance element of a second specified value whereby the operating characteristics of said induction motor may be varied, each of said resistance elements having a greater resistance to electric current than said rotor bars so that said resistance element then installed is heated instead of said basic rotor when said motor is energized.

3. In a squirrel cage electric induction motor the combination comprising a motor enclosure, stator windings positioned within said enclosure, a basic rotor positioned within said enclosure in rotatable relation with said stator, said basic rotor having a plurality of longitudinally extending rotor bars, a ring member electrically connecting said bars at one end, said rotor member including a shaft supported by said enclosure and having an end portion projecting outwardly therefrom, said rotor bars having portions converging toward said shaft and other portions extending longitudinally adjacent to said shaft and projecting outwardly of said enclosure, said rotor bars having terminal end portions, a cylindrical member of nonconducting material having an axial passageway therethrough, said cylindrical member positioned on and rotatable with said shaft, said cylindrical member projecting outwardly of said enclosure and having a plurality of other longitudinal passageways therein, said rotor bars other portions extending through said longitudinal passageways with said rotor bar terminal portions projecting outwardly of said cylindrical member other passageways, an annular disc shaped member having a casing portion with a central aperture therethrough, means to nonrotatably and removably secure said casing to said shaft end portion, said casing having an internal cavity, a plurality of resistance elements extending radially in said casing cavity, a ring member electrically connecting one end portion of said resistance elements, said resistance elements other end portions having a receiver formed thereon, electrically nonconductive packing means positioned in said cavity and fixedly securing said resistance elements and said last named ring member therein, said resistance elements having a first specified resistance value, means connecting said rotor bar terminal portion in said resistance element receiver portion to thereby electrically connect said resistance elements to said rotor bars, said annular disc shaped member and said shaft so constructed and arranged that said disc shaped member may be readily removed and replaced by a second disc shaped member having resistance elements of a second specified value whereby the operating characteristics of said induction motor may be varied, each of said resistance elements having a greater resistance to electric current than said rotor bars so that said resistance elements then installed are heated instead of said rotor bars when said motor is energized.

4. In an electric induction motor the combination comprising a motor enclosure, stator windings positioned within said enclosure, a basic rotor member positioned within said enclosure in rotatable relation to said stator windings, said rotor member including a shaft supported by said enclosure and having an end portion projecting outwardly therefrom, a fixed resistance element of a first specified value nonrotatably and removably secured to said shaft end portion externally of said enclosure so that said resistance element rotates with said shaft, said resistance element having terminal portions, a cylindrical member of nonconducting material having an axial passageway therethrough, said cylindrical member positioned on and rotatable with said shaft, said cylindrical member projecting outwardly of said enclosure and having other longitudinal passageways therein, said rotor member having portions extending through said cylindrical member other passageways and connecting said rotor member to said resistance element terminal portions to thereby electrically connect said resistance element to said basic rotor, said resistance element, said cylindrical member, and said shaft so constructed and arranged that said resistance element may be readily removed and replaced by a second fixed resistance element of a second specified value whereby the operating characteristics of said induction motor may be varied, each of said resistance elements having a greater resistance to electric current than said basic rotor so that said resistance element when installed is heated instead of said basic rotor when said motor is energized.

References Cited by the Examiner

UNITED STATES PATENTS

| | | | |
|---|---|---|---|
| 1,587,760 | 6/1926 | Connell | 310—72 |
| 1,789,294 | 1/1931 | Ballman | 310—210 |
| 2,722,652 | 11/1955 | Brainard | 310—68.4 X |
| 2,897,385 | 7/1959 | Powell | 310—234 |

FOREIGN PATENTS

| | | |
|---|---|---|
| 765,627 | 1/1957 | Great Britain. |
| 634,066 | 8/1936 | Germany. |

MILTON O. HIRSHFIELD, *Primary Examiner.*

DAVID X. SLINEY, *Examiner.*